UNITED STATES PATENT OFFICE.

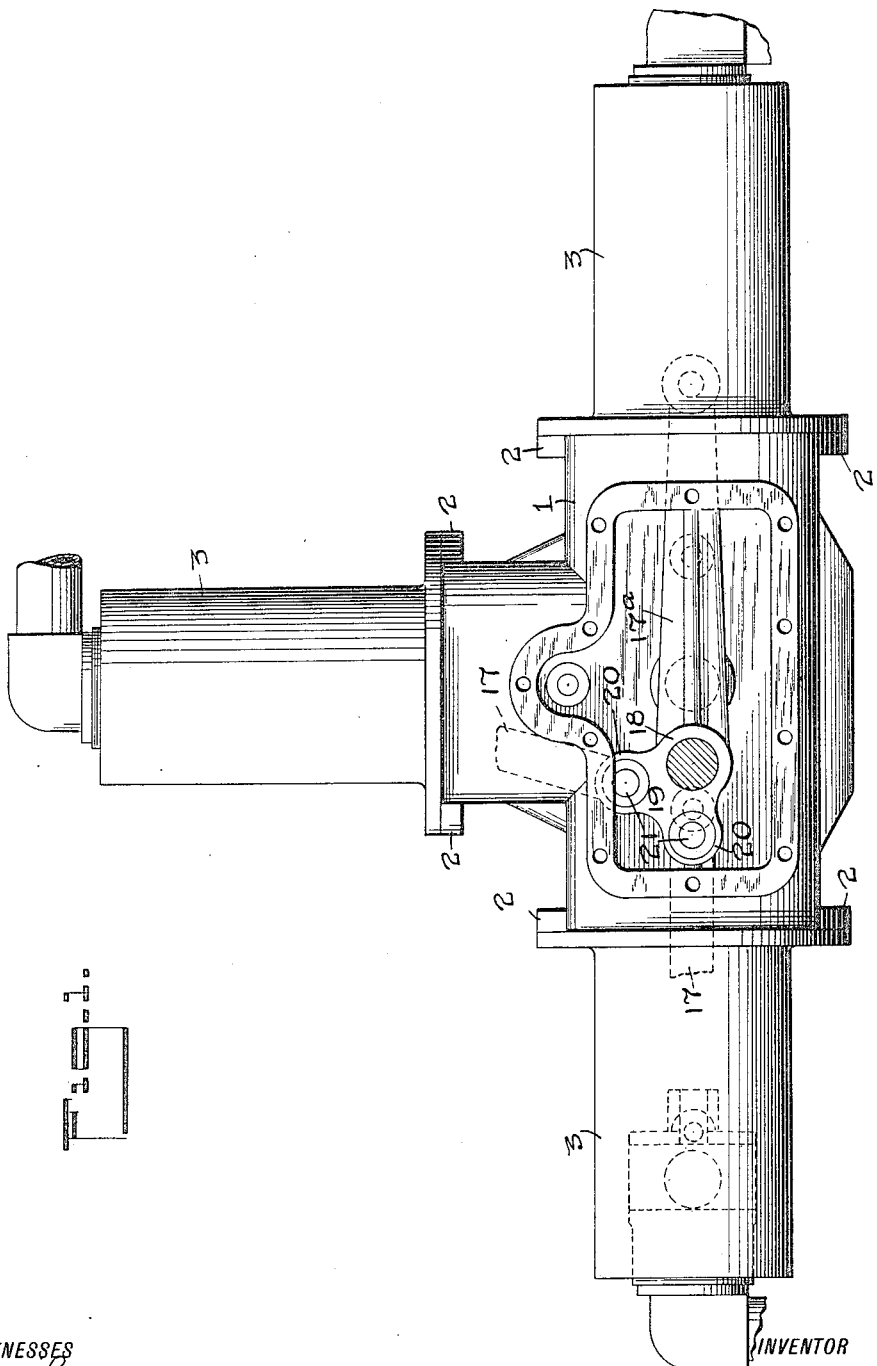

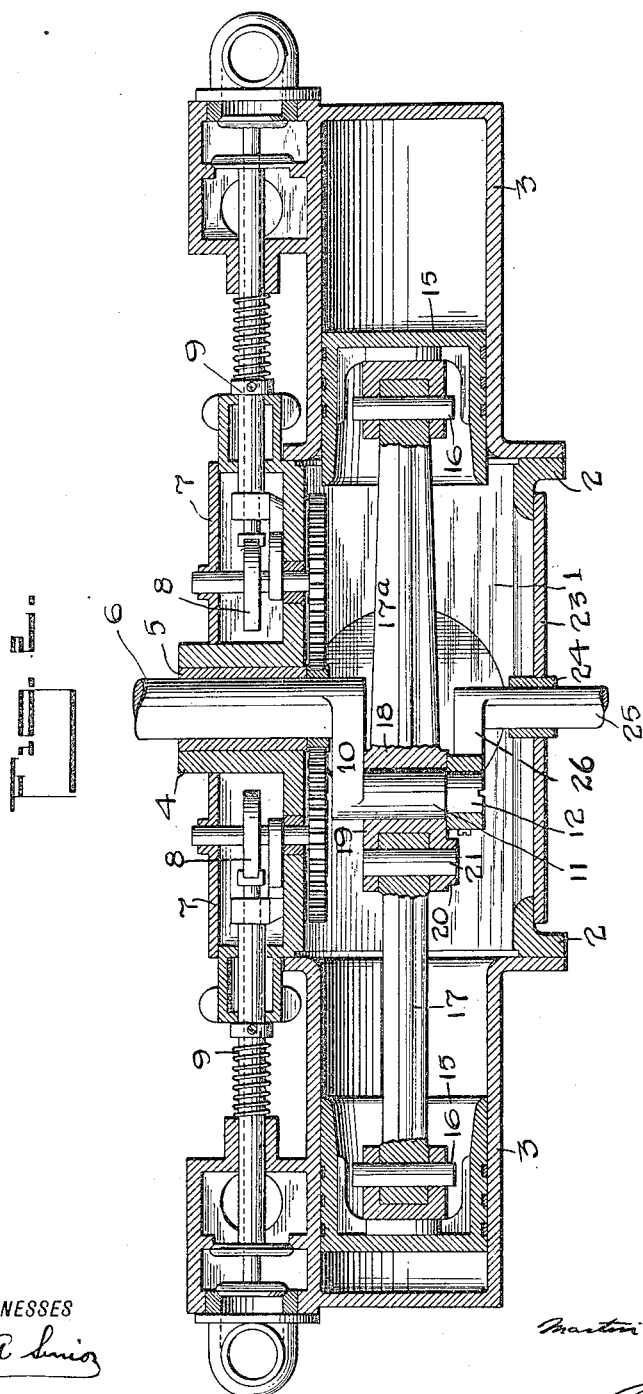

MARTIN V. B. ETHRIDGE, OF BROOKLYN, NEW YORK, ASSIGNOR TO VEHICLE POWER COMPANY, A CORPORATION OF NEW YORK.

HYDROCARBON-ENGINE.

1,209,827.  Specification of Letters Patent.  Patented Dec. 26, 1916.

Application filed April 2, 1913. Serial No. 758,449.

*To all whom it may concern:*

Be it known that I, MARTIN V. B. ETHRIDGE, a citizen of the United States, and resident of Brooklyn, in the county of Kings and State of New York, have invented certain new and useful Improvements in Hydrocarbon-Engines, of which the following is a specification.

This invention relates to hydro-carbon engines particularly for use in motor vehicles where only a limited amount of space is available for an engine, and where the usual forms of engines now in use are objectionable, particularly as they tend to carry the driver's seat farther back from the front of the car than is desirable, and this is especially the case in mercantile wagons. The invention however will be applicable to other uses where similar conditions are encountered.

Briefly stated the invention consists in a multiple cylinder engine having the various cylinders in a single plane which is furthermore a plane of rotation of the engine shaft, the cylinders having characteristics in their construction and arrangement and particularly in the connections of the cylinder pistons with the engine shaft, which provide a maximum degree of strength, simplicity and durability, combined with efficiency and compactness and freedom from vibration.

The invention further includes an engine shaft having only a single crank portion or crank pin which is closely contained between the journal bearings of the engine shaft. By this construction great inherent rigidity is obtained and the parts may also be made of comparatively large and strong construction so as to have abundant strength. Added to or combined with this feature there is further provided a readily removable front bearing for the engine shaft, the bearing also forming part of a crank case door at the front of the engine through which all the interior parts can be removed if desired.

Further aspects of the invention consist in the combination of the foregoing features with other matters and features of the engine as will later be more particularly pointed out.

With the foregoing objects in view the invention consists in the features of construction and combination hereinafter set forth.

In the drawings, Figure 1, is a front elevation of an engine embodying the principles of this invention with the crank case door removed; Fig. 2, is a horizontal sectional view of the same.

The best constructions embodying the invention will include three cylinders at right-angles to one another and with their axes in the same plane.

1 denotes a crank case having flanged lugs 2 to which the cylinders 3 are secured.

4 denotes a journal bearing solidly formed on the rear side of the crank case 3 and having a bushing 5 for the engine shaft 6. On the same side of the crank case are formed the boxes 7 for the eccentrics 8 and valve operating gears 9.

The engine shaft 6 has an integral solidly built crank 10 and crank pin 11, the latter having a reduced portion 12 in the best constructions for the purpose presently described.

The cylinders 3 have pistons 15 which are of the usual construction, being provided with interior wrist pins 16 and pitmen 17 extending toward the common crank pin 11. One of the pitmen denoted 17$^a$ is made with a sleeve 18 embracing the crank pin 11, and fixed to or forming part of this sleeve there is provided a yoke 19 having a construction securing several functions or principles of operation in the structure. This yoke is best made in one solid piece throughout, and integral with the pitmen 17$^a$ and having two pairs of projecting plates 20, which respective pairs receive and hold transverse pins 21 fixed thereto. These pins are embraced by the ends of the pitmen 17 of those cylinders not served by the pitmen 17$^a$ already described. The connection is such that the center lines of the cylinders and their pitmen are all in a single plane perpendicular to the axis of the engine shaft 6. The location of the pin 21 in the plates 20 is not symmetrical in the best constructions embodying the invention with relation to the respective cylinders, that is to say, the pin 21 of the pitmen 17 for the vertical cylinder is offset slightly so as to be as nearly as possible in the line of the downward or power stroke. The importance of this arises from the fact that the power stroke is like a blow delivered with great suddenness, and if there is any bend in the connecting rod or any lever through which this power is delivered, vibrations will be set up which are very destructive, and which cause loss of power. The necessity for avoiding this vibration is much less in the case of the left hand horizontal cylinder whose power stroke is directly cushioned by the compression of the opposite cylinder, which is in direct alinement therewith. It is therefore ordinarily unnecessary to offset anything more than the crank pin 21 of the vertical or unbalanced cylinder.

23 denotes a crank case door having a bearing 24 in which is received a short shaft or spindle 25, having a lateral arm 26 adapted to embrace and be fixed to the projecting end 12 of the crank pin 11 already described. The spindle 25 is in alinement with the engine shaft 6 and constitutes part of the engine shaft, in effect, on account of its rigid connection with the crank pin 11 at the point 12. By virtue of this alinement and further by virtue of the short distance between the bearings 5 and 24, and the nature of the connection 12, the spindle 25 is adapted to serve substantially as well for its purposes as if it were integral with the crank 11 and with the engine shaft 6.

By virtue of the character of the yoke 19, as particularly shown in Fig. 1, and also as shown in Fig. 2, a perfect balance is secured except in the single plane of the cylinder axes, and a rotative torque is imparted to the crank pin 11 with the full efficiency of the combined action of the separate cylinders. Each cylinder operates as effectively as if it were independently and exclusively attached to the crank pin 11, but the arrangement actually permits the use of a single crank pin 11 for a plurality of cylinders which in this way can be very compactly grouped to secure the purposes described in the preliminary part of the specification.

For the purpose of inspection or repair, the crank case door 23 is normally positioned at the front of the car where it can be quickly removed after which all the interior mechanism can be taken out of the engine without disturbing the cylinders and their alinement. New bushings may be put in or any wear taken up, as is frequently required in automobile or hydro-carbon engines.

It will be observed that in the engine as described only three cylinders as provided, two of which are in a horizontal position, and one of which is in an intermediate vertical position. By virtue of this arrangement the engine shaft is kept low as is desirable, and the entire mass of the engine is also comparatively low in the car and out of the way. Substantially the only part of the engine which projects appreciably above the wheel-axles is the vertical or intermediate cylinder, which however takes up only a small amount of space.

What I claim is,—

1. In a hydro-carbon engine, three cylinders at right-angles to one another and in a single plane, a shaft having a single crank portion, pistons and pitmen for the various cylinders, one of said pitmen being sleeved to said crank and having a yoke thereon, the other pitmen being connected to said yoke, the pitmen of the middle cylinder having an offset connection with said yoke whereby the power stroke is in substantial alinement with the crank portion.

2. In a hydro-carbon engine, three cylinders at right-angles to one another and in a single plane, a crank shaft having a single crank portion, pistons and pitmen for the cylinders, one of said pitmen having an integral sleeve and a yoke with pairs of projecting plates integral therewith, and pins passed through the projecting plates of each pair, the other pitmen being connected to said pins, the pitmen of the middle cylinder having an offset connection with said yoke whereby the power stroke is in substantial alinement with the crank portion.

Signed at New York in the county of New York and State of New York this 3rd day of October A. D. 1911.

MARTIN V. B. ETHRIDGE.

Witnesses:
 ALFRED W. PROCTOR,
 GRACE T. DIXON.

Copies of this patent may be obtained for five cents each, by addressing the "Commissioner of Patents, Washington, D. C."